L. WHITMAN.
Garlic and Wheat Separator.
No. 1,728.
Patented Aug. 25, 1840.
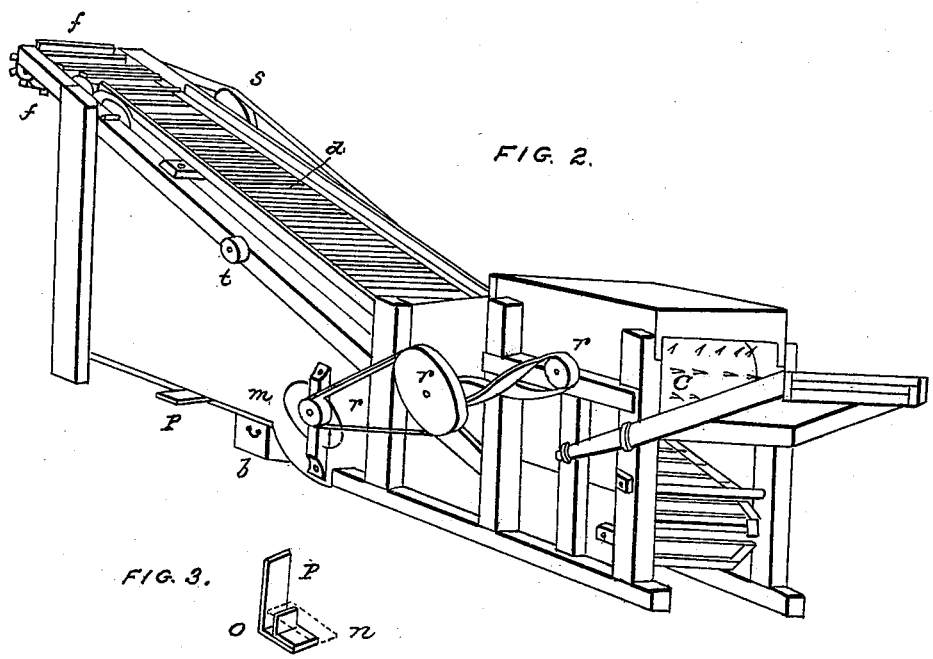
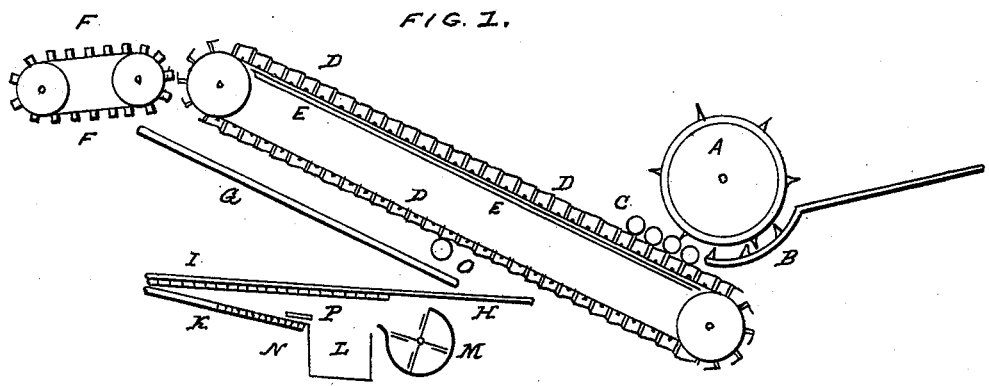

UNITED STATES PATENT OFFICE.

LUTHER WHITMAN, OF WINTHROP, MAINE.

CONDUCTING STRAW AND GRAIN FROM THRESHERS.

Specification of Letters Patent No. 1,728, dated August 25, 1840.

*To all whom it may concern:*

Be it known that I, LUTHER WHITMAN, of Winthrop, in the county of Kennebec and State of Maine, have invented a new and useful Improvement in Machines for Separating Grain from the Straw and Chaff, called "Whitman's Separator," of which the following is an exact description, reference being made to the accompanying drawings.

Figure 1, is a longitudinal section of the machine. A, is the thresher made in the usual form of threshing machines, viz: a cylinder of cast iron with spike or wedge formed teeth. B, the concave, also made of cast iron in the common form with similar teeth as the thresher; C, wooden rolls called guard rolls placed in front and a little below the concave, to receive the grain as it is thrown from the thresher and prevents its wearing the slats of the belt below. D, D, is an endless belt of troughs or cells. This belt is placed upon drums, over which it revolves one of which is below the thresher and the other is elevated at the top of the further end of the machine, thus placing the belt in the position of an inclined plane. The use of this belt is, to carry up the straw and grain after they have passed the thresher, and is made in the following manner. Thin slats of wood from one to two inches in width are placed on their edges from one to four inches apart. These are held in this situation by being riveted to an endless flat chain at each end. These slats while held in this position, form cells or troughs, open at the top, and resting upon a board below that serves as a bottom. This board is represented at E, E. The grain in its passage falls into these cells and as the belt is moved by a band passing from the shaft of the thresher to a pulley upon one of the drums over which the belt is stretched, the motion of the thresher produces a corresponding motion in the belt, and the straw and grain passes forward as fast as it is delivered from the thresher. After the straw and grain arrive at the top of the inclined plane, it is thrown onto an endless band F, F. This band is made by tacking wooden bars about an inch square, to belts of leather at each end. This band is stretched over small drums on the shaft of one of which is a pulley over which the band S, Fig. 2, passes, and which comes from a pulley on the shaft of one of the drums, over which the slat belt passes, and motion is thus communicated to it. This band F, F, is placed horizontally. The straw and some of the grain is thrown upon this by the slat or trough belt. The straw is thrown off at the end of the machine by its motion and the grain, falling between the bars, is conveyed to the winnowing machine in the following manner, viz: A smooth board G, is placed in a position inclining toward the thresher, and underneath the belt of slats D, D, and held in its place by being confined to the sides of the machine. This board extends down to the shoe of the sieves, just over which it terminates, and the grain which falls upon it (the board) slides down and falls into the shoe. This shoe is represented at H, and is attached to one end of the sieve I. It has sides or edges of board raised an inch or two to retain the grain and, together with the sieve, is placed inclining a little the contrary way from what the board does. This shoe and sieve are shaken in the way and manner that they are in common winnowing mills, by means of a rod passing from the farther end of the sieve I, and attached to a small crank on the shaft of the vanes or fans of the machine. The grain is thus shaken from the shoe onto the sieve I. This sieve suffers all to pass through it but the heads and other larger straws which may fall into the shoe with the grain. The grain and small seeds thus falling through, are received upon a finer sieve below represented at K. This is inclined a little, the contrary way from the upper one I, and is so fine as to permit only the small seeds to pass through it into a reservoir below and the grain slides over it into a box L, below, being subjected in its passage from the shoe H, to this box, to the wind from the fans, M. These fans are made in the usual form of fans or vanes for winnowing, and are made to revolve by means of a band from one of the drums above, or from the thresher if you please. As it is necessary to remove the box L, when full of grain in order to prevent any grain from falling on the floor while shifting the boxes, I place a slide *p* Figs. 1, and 2, above the box L, which may be pushed across the orifice through which the grain falls in its passage from the last sieve, and retains it until another box is put under, when, by being slipped back it allows the grain to fall into the box. N, is the space or reservoir into which the small seeds fall. O, represents a small roller or truck placed midway under the belt of slats to support and prevent their sagging.

Fig. 2 is a perspective view of the machine, the several letters referring to the same parts as the same letters in Fig. 1, viz: $a$, the thresher; $d\ d$, the belt of slats or troughs; $f, f$, the endless chain of logs or bars for throwing the straw off; $l$, the box to receive the grain; $m$, the fans or vanes of the winnowing machine; $p$, slide for shutting off the grain; $r, r, r, r$, pulleys or bands which carry or drive the winnowing machine; the crank and rod or bevel gear (either of which may be used) for shaking the sieves is on the other side and not shown here; $s$, pulley and band for carrying the belt of slats; $t$, a pulley on which a band may be put for driving the winnowing machine independently of the thresher.

Fig. 3, represents the form of one of the flat links which make up the chain into which the slats are put in order to form the slat or trough belt. These are made of sheet iron or tin, bent in the form represented in the figure. $o$ is the space into which the slat is inserted before the long end $p$, is turned down at right angles as represented by the dotted lines $n$. Sometimes I cut these ends off at the height of the slat instead of doubling them down but generally prefer to turn them down.

Operation: In order to operate better my machine, a belt is brought from some moving power and put upon the pulley attached to the shaft of the thresher, and thus the thresher set in motion, and by means of the several connecting belts the whole machine is put into motion. The straw is then fed in at the opening in front of the thresher, passes through the teeth, becomes threshed, and is thrown upon the trough belt below. By this belt the grain and threshed straw is carried upward and forward, till it meets the short belt of logs at the upper end which receives the straw and throws it off while the grain drops down through the interstices onto the inclined plane or board G. From thence it slides into the shoe of the upper sieve, and from thence it is shaken onto the upper coarse sieve I, and subjected to the action of the wind from the vanes or fans $m$. From this sieve it falls upon the finer sieve below and while the small seeds pass into the reservoir N, the grain slides over into the box L, thoroughly cleansed and ready from the granary.

What I claim as my improvement and for which I ask an exclusive right, is—

The combination of the endless belt of slats constructed as herein set forth, with the inclined plane E, E, and straw carrier F, F, the whole being so arranged that the belt D, while it conveys the straw from the thresher carries the grain also with it up the inclined plane in the manner herein described.

LUTHER WHITMAN.

Witnesses:
SAM. WOOD, Jr.
E. HOLMES.